United States Patent
Heinzig et al.

(10) Patent No.: US 7,927,141 B2
(45) Date of Patent: Apr. 19, 2011

(54) ELECTRICAL SHIELDING ARRANGEMENT

(75) Inventors: Peter Heinzig, Wendelstein (DE); Jens Hoppe, Schwarzenbruck (DE); Dietmar Jahnel, Nürnberg (DE); Lambert Schummer, Nürnberg (DE)

(73) Assignee: Siemens Aktiengesellschaft, Meunchen (DE)

( * ) Notice: Subject to any disclaimer, the term of this patent is extended or adjusted under 35 U.S.C. 154(b) by 318 days.

(21) Appl. No.: 12/279,747

(22) PCT Filed: Feb. 16, 2007

(86) PCT No.: PCT/EP2007/051488
§ 371 (c)(1),
(2), (4) Date: Aug. 18, 2008

(87) PCT Pub. No.: WO2007/096299
PCT Pub. Date: Aug. 30, 2007

(65) Prior Publication Data
US 2009/0205863 A1    Aug. 20, 2009

(30) Foreign Application Priority Data
Feb. 21, 2006   (DE) .................. 10 2006 008 922

(51) Int. Cl.
*H01R 13/648* (2006.01)
(52) U.S. Cl. ............................... 439/607.01
(58) Field of Classification Search ........... 439/607.01; 174/143, 419, 73.1
See application file for complete search history.

(56) References Cited

U.S. PATENT DOCUMENTS

| | | | | |
|---|---|---|---|---|
| 3,479,443 A | * | 11/1969 | Mashikian et al. | 174/73.1 |
| 3,538,241 A | * | 11/1970 | Rein | 174/143 |
| 3,673,305 A | * | 6/1972 | Mashikian et al. | 174/12 BH |
| 3,735,019 A | * | 5/1973 | Hess et al. | 174/31 R |
| 4,228,318 A | * | 10/1980 | Selsing | 174/73.1 |
| 5,493,072 A | | 2/1996 | Stevens | |
| 5,902,963 A | * | 5/1999 | Chappaz et al. | 174/167 |

FOREIGN PATENT DOCUMENTS

| | | |
|---|---|---|
| DE | 2205035 | 8/1973 |
| EP | 0169922 B1 | 2/1986 |
| EP | 0285895 A1 | 10/1988 |
| EP | 0688075 A1 | 12/1995 |
| EP | 1487074 A1 | 12/2004 |
| JP | 58125808 A | 7/1983 |
| JP | 59036909 A | 2/1984 |
| SU | 1830551 A1 | 7/1993 |

OTHER PUBLICATIONS

German Office Action dated Oct. 5, 2006.
German Office Action dated Nov. 9, 2007.
International Search Report dated May 21, 2007.

* cited by examiner

*Primary Examiner* — Jean F Duverne
(74) *Attorney, Agent, or Firm* — Laurence A. Greenberg; Werner H. Stemer; Ralph E. Locher

(57) ABSTRACT

An electrical shielding arrangement of a high-voltage line has at least two coupling elements. The coupling elements each have a tubular control electrode about a line leadthrough and are surrounded by a barrier. Owing to the fact that the reduction in the diameters of the control electrode and the barrier is matched in relation to one another, a barrier decoupled in this way can be used for mechanically tensioning the coupling systems which have been pushed one inside the other.

19 Claims, 2 Drawing Sheets

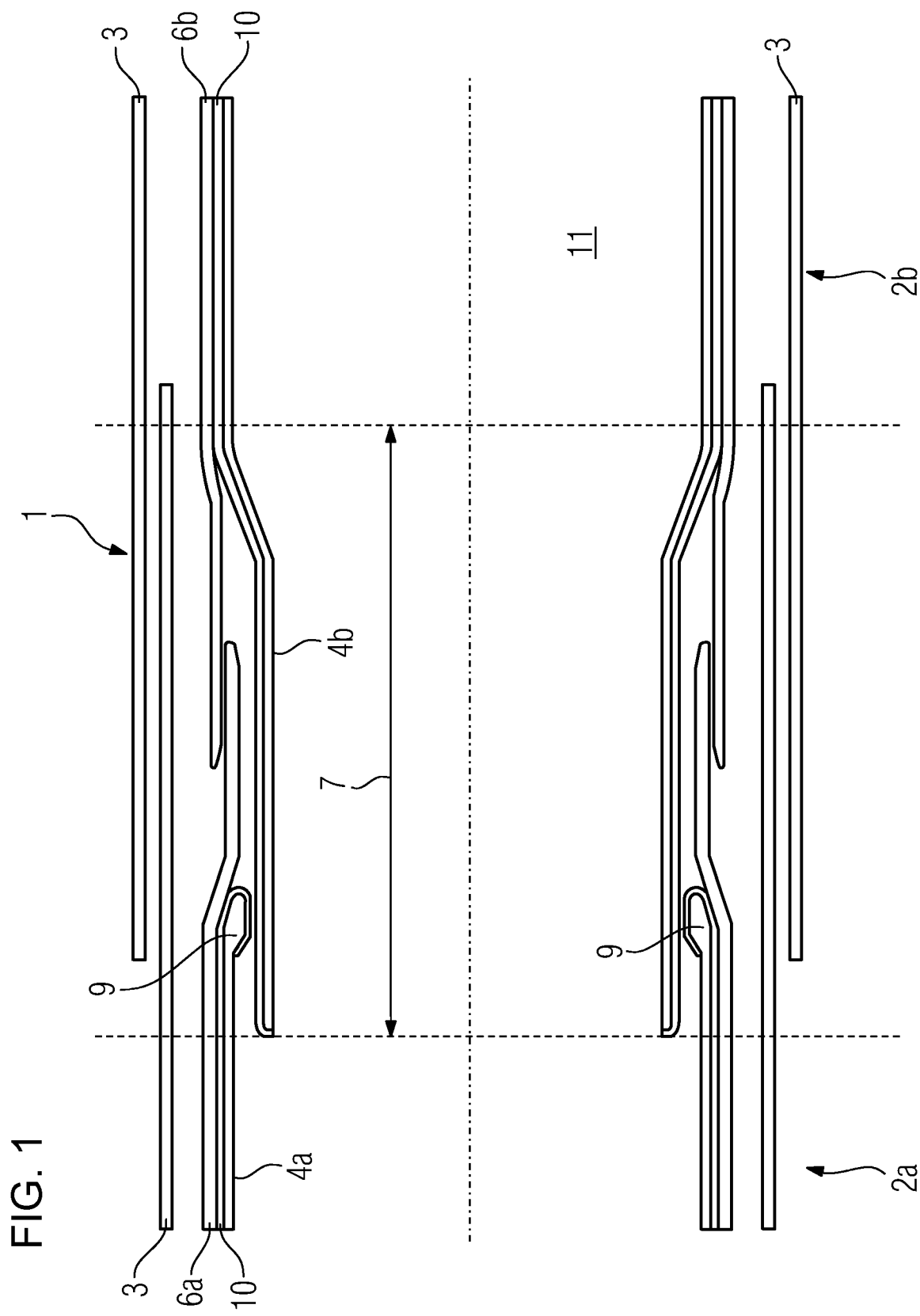

ELECTRICAL SHIELDING ARRANGEMENT

BACKGROUND OF THE INVENTION

Field of the Invention:

The invention relates to an electrical shielding arrangement of a high-voltage line having a first coupling element and at least one second corresponding coupling element, wherein the coupling elements can be pushed into one another and has in each case a tubular control electrode around a line leadthrough, and the tubular control electrodes are in each case sheathed by at least one tubular insulating barrier and are connected to it.

At the same time, the subject matter of the present invention is a coupling element for an electrical shielding arrangement for a high-voltage line having a tubular control electrode and a tubular insulating barrier.

The electrical connection of electrical installations, particularly high-voltage installations, requires a high technical expenditure for the electrical shielding of the incoming and outgoing voltage lines. In the case of lead-outs and lead-throughs to electrical installations, in particular, electrical shielding must be given at all times and over the entire line route. In particular in cases in which the electrical installation is an oil-filled transformer or a choke coil for high operating voltages, respectively, the line route is arranged in a grounded and oil-containing dome of the corresponding electrical installation.

Electrical shielding of the line leadthrough is indispensible especially for high direct voltages as occur in the case of high-voltage direct-current transmissions.

If it is necessary to compensate for length between two connecting pieces, so-called disconnect points consisting of two displaceable, paper-insulated control electrodes can be located in the leadthroughs of these electrical installations.

In addition, these disconnect points are preferably equipped with a barrier system enclosing the control electrode, in which an insulating fluid, particularly an oil, circulates and thus supports the insulating shielding effect.

At present, disconnect points are known in which the corresponding control electrodes can be pushed into one another. In this arrangement, it is problematic, however, that the barriers are designed in such a manner that additional elements are integrated at the barriers for locking purposes. In particular, wedge-shaped enlargements and similar geometric elements are adapted to the electrical requirements and are used at the same time for wedging the mostly two-part barrier system past the disconnect point. Furthermore, a first coupling piece of the disconnect point is conventionally equipped with a lesser diameter than the corresponding second coupling element. The altered diameter in connection with additional elements of the barrier system located directly on the control electrode results in a wedging of the coupling elements pushed into one another. However, it is problematic that the coupling elements are locked only in precisely one position so that the coupling elements must be matched precisely to one another with respect to the locking point. Axial excessive or insufficient lengths of the lines can therefore be compensated only partially or not at all with the conventional technology via the coupling elements in the disconnect point.

Thus, DE 690 24 335 T2 describes a socket for high direct voltages. According to this invention, a capacitive control of the electrical field is achieved by means of a capacitor body arranged around the disconnect point. In this arrangement, a position is defined in the axial direction with respect to the line leadthrough, which is constructed as a type of straight, outward-pointing truncated cone, is defined in dependence on the radii of the capacitor body which are arranged within one another.

Furthermore, DE 690 12 258 T2 discloses an inside capacitor wall for controlling the field of the line connection of a transformer leadthrough. According to this invention, the capacitor insulating wall prevents an arc-over of the electrical voltage, in which this barrier is suitable for capacitively and resistively controlling the electrical field and is dimensioned in such a manner that the voltages and field strengths occurring in the respective area do not lead to a destruction of the barriers.

Furthermore, EP 0 169 922 B1 discloses an insulating element for high-voltage devices. According to this invention, an insulating cylinder is reduced with respect to its wall thickness and chamfered in an area of overlap so that a corresponding insulating cylinder with corresponding reduction in the wall thickness and chamfering in the area of overlap is used in the area of overlap.

The disadvantageous factor in all solutions of the prior art is that a mechanical tensioning of the barriers into one another does not allow any or only slight tolerances with respect to the locking point of the coupling elements against one another. Due to the position of the tilting elements in the barrier system and due to the chamfering of corresponding barriers, respectively, it is not possible to freely select the axial distance between the barriers, and thus also the control electrodes, within a certain range. However, this is necessary if, when subsequently two lines are connected, no complete accuracy of fit is given here and inasmuch as this disconnect point is also used for compensating for the corresponding shielding elements arranged around the disconnect point.

BRIEF SUMMARY OF THE INVENTION

It is thus the object of the present invention to avoid the abovementioned disadvantages of the prior art and to provide a shielding which can be rapidly and simply produced and guarantees great tolerance with respect to the coupling elements relative to one another. At the same time, the two line routes should be pluggable.

The object is achieved by the characterizing features of patent claim 1. According to the invention, it is provided that in an area of overlap, at least one tubular insulating barrier is not mechanically connected to the respective control electrode and the tubular control electrode and the tubular insulating barrier have a variable diameter compared with the diameter outside the area of overlap, the diameters of the tubular insulating barriers of the two coupling elements being matched to one another in such a manner that the tubular insulating barriers overlap when they are pushed into one another and mechanically tension one another. Due to the decoupling of at least one barrier from the control electrode of a coupling element in the area of overlap, mechanical strength can be guaranteed by means of the barrier, taking into consideration the insulating characteristics. At the same time, this enables the basic diameters of the line route, of the control electrodes and of the barriers to remain identical in the outer area of the respective shielding arrangements and to this extent the expenditure of producing control electrodes, and barriers sheathing them, with different diameters is lacking. Furthermore, this ensures that with a circulation of a circulation medium between the barrier and the tubular control electrode, the insulation medium is here used as additional insulation and for electrical field guidance. The aim of the shielding arrangement according to the invention is to achieve a resistive control of the electrical direct-voltage field by the shape of the electrodes, the shape and thickness of the insulation material and the arrangement and thickness of the barriers which meet the electrical dimensioning parameters such as maximum direct-voltage field strengths and permissible electrical tangential field strengths.

Tubular in the sense of the invention means that the elements thus correspondingly designated have a longitudinal extent and are constructed over an almost circular cross section. In this arrangement, however, the element in each case designated in this way does not need to be completely constructed as a type of tube but can also have openings and partial openings segment by segment. The definition "circular" also includes cross sections deviating from this such as, e.g. elliptical, triangular or multi-angular structures.

The number of coupling elements at a disconnect point is not limited. Thus, three or four coupling elements can also be combined in each case to form one connecting point. The necessary adaptations of the barriers and control electrodes for a corresponding pushing into one another and tensioning in a four-element shielding arrangement are then possible by means of suitable additional elements such as, e.g. L-shaped elements on the barriers and control electrodes for coupling elements in each case arranged at right angles to one another.

In an advantageous embodiment, the tubular insulating barriers are constructed to be almost parallel to the direction of displacement of the coupling elements with respect to the line route in the area of overlap. This ensures that when the coupling elements are pushed into one another, the barriers extending parallel to the line route and pushed into one another are simultaneously pushed into one another and can be tensioned with respect to one another.

The tubular insulating barriers are advantageously constructed in the area of overlap. The stepped construction of the barriers in the area of overlap ensures that, on the one hand, great mechanical stability with respect to the barriers lying outside the area of overlap is given. At the same time, this provides a parallel alignment of the end area of the barriers in the area of overlap.

The tubular insulating barriers advantageously consist at least partially of pressboard.

The tubular insulating barriers of the respective coupling elements are advantageously constructed as barrier system in the area of overlap, wherein the individual barriers of the coupling elements at least partially overlap and/or mechanically tension one another, and an insulating fluid, particularly an oil, can be circulated within the barrier system. This ensures that the field guidance is guaranteed also in the areas away from the line by means of a multi-step barrier system. The use of pressboard and of the corresponding partial overlap of the individual components of the barrier system with respect to one another, in particular, ensures that the flow of the insulating fluid, particularly of an insulating oil, remains ensured within the ducts thus formed.

The control electrode advantageously has an insulation, preferably of paper, the insulation, in particular, being arranged between the tubular control electrode and the respective tubular insulating barrier.

In an advantageous embodiment, the tubular insulating barriers, pushed into one another, of the coupling elements overlap by up to 500 mm, preferably 10 mm. In the case of high-voltage direct-current transmissions, in particular, a large area of overlap is of advantage for the electrical resistive field guidance.

The object is also achieved by the characterizing features of claim 9. In this context, it is provided that the tubular insulating barrier is not connected to the tubular control electrode in a coupling area of the coupling element and has a reduced diameter, compared with the diameter outside the coupling area. These measures ensure that no different tube diameters are necessary for the control electrodes or the barriers, respectively. At the same time, this provides a possibility of connecting the barrier as a mechanical coupling element in conjunction with the insulating characteristics.

The coupling area of a coupling element in the sense of the present invention is smaller than the area of overlap of the shielding arrangement, the coupling area being approximately half as long as the area of overlap in a first approximation.

Furthermore, it is provided according to the invention that the tubular insulating barrier has a mechanical strength in the coupling area and/or consists at least partially of pressboard.

According to the invention, the coupling element is constructed in such a manner that the tubular control electrode and/or the tubular insulating barrier are constructed to be stepped and, in particular, are aligned in parallel with the longitudinal extent of the line leadthrough.

According to the invention, it is provided that the tubular insulating barrier is constructed as a barrier system which is surrounding at least in the coupling area. In an advantageous embodiment, the tubular insulating barrier is mechanically reinforced in the longitudinal direction at least in the coupling area. The reinforcement can be produced by wrapping the insulating barrier with a strengthening tape in the coupling area and by applying additional materials and/or by impregnation by means of a resin.

In an advantageous embodiment, the tubular control electrode and the tubular insulating barrier has a reduced diameter in the coupling area compared with the diameter in the outside area, the diameter of the tubular insulating barrier being greater in the coupling area than the diameter of the tubular control electrode. This ensures that the barrier surrounds the control electrode with respect to the line leadthrough.

BRIEF DESCRIPTION OF THE SEVERAL VIEWS OF THE DRAWING

Other advantageous embodiments are obtained from the subclaims. Some exemplary embodiments are explained by means of the figures, in which:

FIG. 1 shows a diagrammatic side view of the electrical shielding arrangement according to the invention;

DESCRIPTION OF THE INVENTION

Figure 2A:
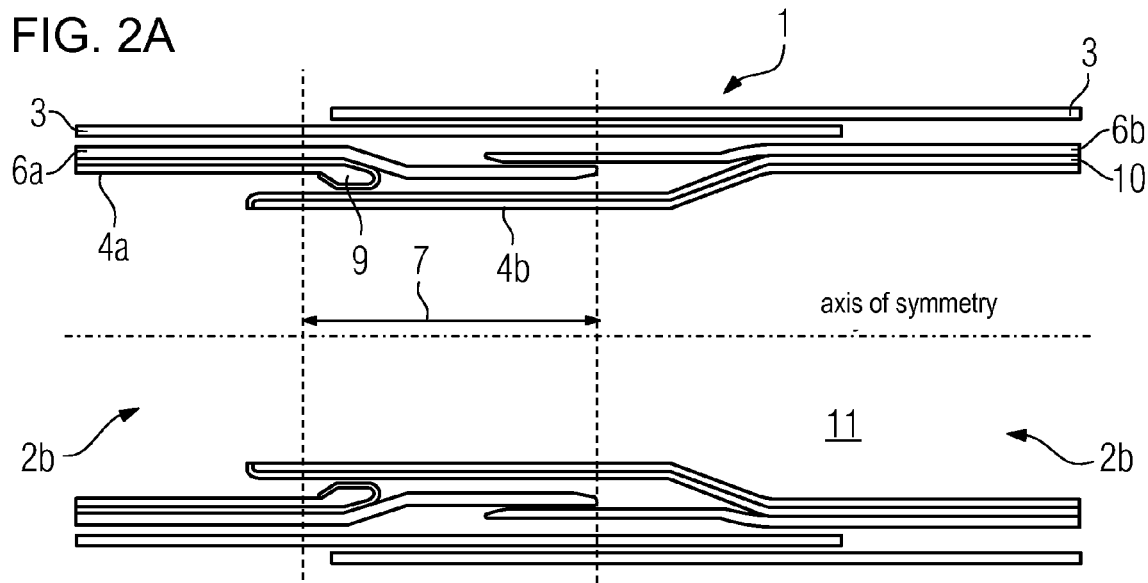
FIG. 2a, 2b show a diagrammatic view of the electrical shielding arrangements according to the invention for two states during the pushing together of the coupling elements.

The figure FIG. 1 shows an electrical shielding arrangement 1 according to the invention in which the coupling elements 2a, 2b are pushed into one another. The control electrode 4a of the first coupling element 2a has a small radial distance compared with the control electrode 4b of the second coupling element 2b. The control electrodes 4a, 4b have an insulation layer 10. In the area of overlap, both insulating barriers 6a, 6b have a different diameter than the control electrodes 4a, 4b. At the same time, at least one control electrode 4a is not connected mechanically to the associated barrier 6a. This results in the advantage that the tubular barrier 6a in the area of overlap 7, apart from the insulating and control characteristics of the electrical field, is also used for mechanically tensioning the respective coupling elements 2a, 2b. The line leadthrough 11 is located in the center of the drawing. The diagrammatic side view represents a rotationally symmetric representation of the shielding arrangement 1 according to the invention. In deviation from this, the tubular control electrode 4a and/or the tubular insulating barrier 6a can also have openings and partial openings so that no complete rotational symmetry of the drawing FIG. 1 and of the subsequent figures FIGS. 2a and 2b can exist.

Figure 2B:
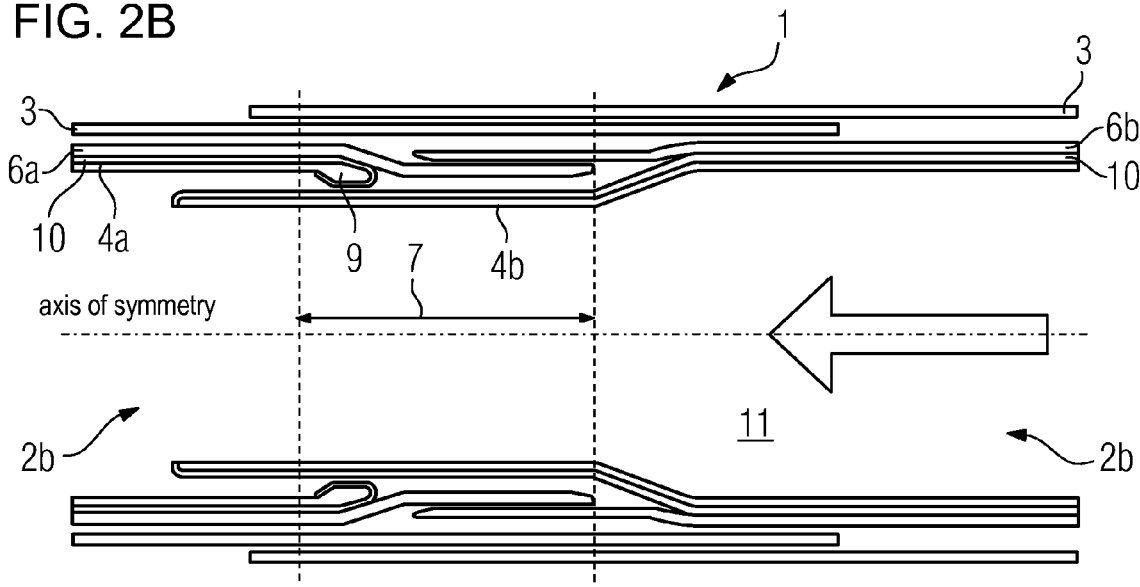

The figures FIGS. 2a and 2b show two different tensioning states of the shielding arrangement 1. In the upper figure as figure FIG. 2a, it is shown that the area of overlap 7 of the barriers 3, 6a, 6b and of the control electrodes 4a, 4b is small. Pushing the coupling elements 2a, 2b into one another according to figure FIG. 2b also ensures electrical shielding of the shielding arrangement 1 in the area of overlap 7 and at the same time provides the possibility of compensation in the axial direction. In both states shown, however, mechanical tensioning and electrical shielding of the shielding arrangement 1 according to the invention is already ensured. The coupling elements 2a, 2b can be additionally fixed with respect to one another by external fixing means (not shown).

Figure 3:
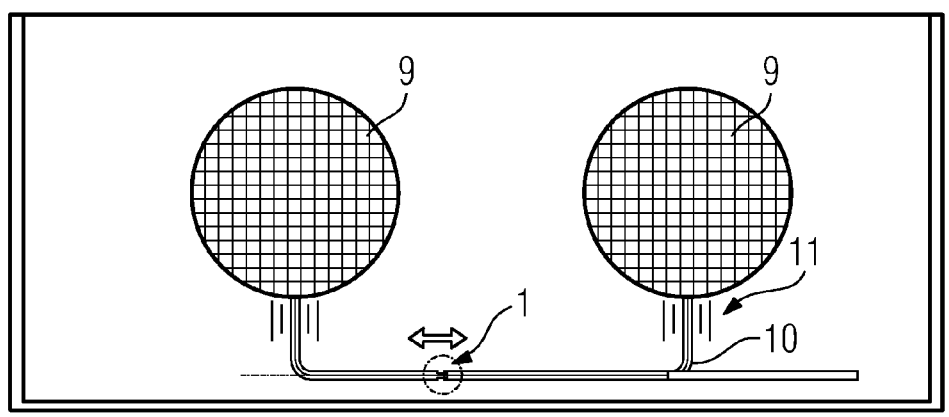
FIG. 3 shows a diagrammatic view of an electrical shielding arrangement according to the invention as disconnect point between two windings.

The figure FIG. 3 shows the electrical shielding arrangement 1 according to the invention as a disconnect point between two windings 9 of a transformer, particularly a high-voltage direct-current transmission transformer. The possibility of axial compensation for the excessive or insufficient lengths of the lines 10 along the line route provides the possibility of matching the lead-outs from the corresponding windings 9 accurately to one another. No corresponding post treatment and precise matching of the coupling elements 2a, 2b to one another in the area of overlap is necessary, therefore.

In this arrangement, it is also advantageous that the control electrodes 4a, 4b need a reduced insulation cover of paper at the disconnect point. The result is that a smaller direct-voltage field occurs in the paper of the disconnect point area and the permissible electrical design parameters are maintained. The production expenditure is reduced since correspondingly additional geometric elements for tensioning are unnecessary which, at the same time, do not allow any variability with respect to the axial compensation of the coupling elements 2a, 2b with respect to one another. The first barrier 6a is fixed on the respective tubular control electrode 4a. A corresponding barrier system 3, 6a, 6b can conduct a direct-voltage field.

The invention claimed is:

1. An electrical shielding arrangement of a high-voltage line, comprising:
   a first coupling element and at least one second corresponding coupling element disposed to be pushed into one another;
   each of said first and second coupling elements having a tubular control electrode around a line leadthrough;
   a tubular insulating barrier connected to and sheathing each said tubular control electrode;
   at least one of said tubular insulating barriers is not connected to the respective said control electrode in an area of overlap and said tubular control electrode and said tubular insulating barrier have a changed diameter;
   the diameters of said tubular insulating barriers of said first and second coupling elements are matched to one another such that said tubular insulating barriers overlap and mechanically tension one another upon being pushed into one another, said tubular insulating barriers together with an additional barrier being configured to form a barrier system surrounding the area of overlap and an insulating fluid circulating within said barrier system.

2. The electrical shielding arrangement according to claim 1, wherein said tubular insulating barriers are constructed substantially parallel to a direction of displacement of said coupling elements with respect to the line leadthrough in the area of overlap.

3. The electrical shielding arrangement according to claim 1, wherein said tubular insulating barriers are stepped in the area of overlap.

4. The electrical shielding arrangement according to claim 1, wherein said tubular insulating barriers are formed at least partially of pressboard.

5. The electrical shielding arrangement according to claim 1, wherein said insulating fluid is oil.

6. The electrical shielding arrangement according to claim 1, wherein said tubular control electrode has an insulation.

7. The electrical shielding arrangement according to claim 6, wherein said insulation is paper.

8. The electrical shielding arrangement according to claim 6, wherein said insulation is disposed between said tubular control electrode and the associated said tubular insulating barrier.

9. The electrical shielding arrangement according to claim 1, wherein said tubular insulating barriers of said coupling elements, upon being pushed into one another, overlap by up to 500 mm.

10. The electrical shielding arrangement according to claim 1, wherein said tubular insulating barriers of said coupling elements, upon being pushed into one another, overlap by approximately 10 mm.

11. The electrical shielding arrangement according to claim 1, wherein said tubular control electrodes, upon being pushed into one another, have a radial distance of up to 20 mm.

12. A coupling element of an electrical shielding arrangement for a high-voltage line, comprising:
   a tubular control electrode
   a tubular insulating barrier connected to said tubular control electrode, but not connected to said tubular control electrode in a coupling area of the coupling element; and
   said tubular insulating barrier having a different diameter in the coupling area compared with a diameter of said tubular insulating barrier outside the coupling area, said tubular insulating barrier being mechanically rigid and/or said tubular insulating barrier at least partially containing pressboard in the coupling area.

13. The coupling element according to claim 12, wherein said tubular control electrode has a different diameter in the coupling area compared with said tubular control electrode outside the coupling area.

14. The coupling element according to claim 12, wherein at least one of said tubular control electrode and said tubular insulating barrier has a stepped configuration.

15. The coupling element according to claim 14, wherein at least one of said tubular control electrode and said tubular insulating barrier is stepped in parallel with a longitudinal extent of a line leadthrough.

16. The coupling element according to claim 12, wherein said tubular insulating barrier forms a barrier system surrounding at least the coupling area.

17. The coupling element according to claim 12, wherein said tubular insulating barrier is mechanically reinforced at least in the coupling area.

18. The coupling element according to claim 12, wherein said tubular control electrode and said tubular insulating barrier have a reduced diameter compared with an outside area in the coupling area, the diameter of said tubular insulating barrier being greater in the coupling area than the diameter of said tubular control electrode.

19. The coupling element according to claim 12, wherein said tubular control electrode includes an insulated rounding element.

* * * * *